US009742970B1

(12) United States Patent
Saha et al.

(10) Patent No.: US 9,742,970 B1
(45) Date of Patent: Aug. 22, 2017

(54) DIRECTIONAL IMAGING USING CAMERA POSITIONING IN LIGHT FIXTURES FOR MINIMIZING PROTECTIVE WINDOW SIZE

(71) Applicant: General Electric Company, Schenectady, NY (US)

(72) Inventors: Koushik Babi Saha, Strongsville, OH (US); Jonathan Robert Meyer, Shaker Heights, OH (US); Thomas Clynne, East Cleveland, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 15/168,215

(22) Filed: May 30, 2016

(51) Int. Cl.
*H04N 5/225* (2006.01)

(52) U.S. Cl.
CPC ......... *H04N 5/2256* (2013.01); *H04N 5/2252* (2013.01)

(58) Field of Classification Search
CPC .... H04N 5/2256; H04N 5/2252; H04N 5/349; H04N 5/2259; H04N 5/2257; H04N 5/2254; H04N 2005/2255; H04N 2013/0088; H04N 1/00519; G03B 37/00; G03B 37/02; G03B 37/005; G03B 37/04
USPC .................................................. 348/370–376
See application file for complete search history.

(56) References Cited

U.S. PATENT DOCUMENTS

| | | | | |
|---|---|---|---|---|
| 4,557,570 A * | 12/1985 | Hines | ..................... | G03B 35/08 352/57 |
| 6,525,766 B1 * | 2/2003 | Ikoma | ............. | G08B 13/19619 348/143 |
| 7,961,234 B2 * | 6/2011 | Viinikanoja | ....... | H04N 13/0239 348/218.1 |
| 8,180,214 B1 * | 5/2012 | Pizzo | ..................... | G03B 35/08 396/325 |
| 8,400,560 B1 * | 3/2013 | Yang | ....................... | B60R 11/04 348/148 |
| 8,660,420 B2 * | 2/2014 | Chang | ..................... | G03B 35/08 396/326 |
| 9,635,224 B2 * | 4/2017 | Bart | ..................... | H04N 5/2252 |
| 2006/0147194 A1 * | 7/2006 | Jones | ................ | G08B 13/1963 396/427 |
| 2008/0055409 A1 * | 3/2008 | Mars | ...................... | G03B 37/02 348/143 |
| 2009/0216394 A1 * | 8/2009 | Heppe | .................. | B64C 39/024 701/16 |
| 2010/0225802 A1 * | 9/2010 | Yamamoto | ........... | F16M 11/126 348/373 |

(Continued)

*Primary Examiner* — Pritham Prabhakher
(74) *Attorney, Agent, or Firm* — GE Global Patent Operation; Peter T. DiMauro

(57) ABSTRACT

The specification and drawings present a light fixture for an imaging camera, where a protective window size requirements for camera imaging in a wide field of view (WFOV) are minimized using directional imaging through the protective window. This can be accomplished by a camera position adjustment according to a predefined algorithm as described herein. This adjustment may be performed using a mechanical motor or manually (using corresponding screws, lever, etc.) to actuate a mechanical mechanism. For example, a four-bar linkage mechanism may be used, which may allow the camera to pivot about a virtual pivot point (or generally, a pivotal area) generated by the intersection of the camera lens bore sight axes (camera lens central axes), e.g., outside of a housing of the light fixture.

20 Claims, 7 Drawing Sheets

(56) References Cited

U.S. PATENT DOCUMENTS

| | | | |
|---|---|---|---|
| 2012/0045197 A1* | 2/2012 | Jones | G03B 17/02 |
| | | | 396/427 |
| 2014/0248045 A1* | 9/2014 | Wada | G03B 17/561 |
| | | | 396/427 |
| 2015/0085182 A1* | 3/2015 | Jones | H04N 5/2254 |
| | | | 348/374 |
| 2015/0124103 A1* | 5/2015 | Dawson | H04N 5/2259 |
| | | | 348/169 |
| 2016/0112608 A1* | 4/2016 | Elensi | H04N 5/2252 |
| | | | 348/143 |
| 2017/0019571 A1* | 1/2017 | McBride | H04N 5/2252 |

* cited by examiner

DIRECTIONAL IMAGING USING CAMERA POSITIONING IN LIGHT FIXTURES FOR MINIMIZING PROTECTIVE WINDOW SIZE

TECHNICAL FIELD

The invention generally relates to imaging cameras. More particularly but not exclusively, this invention relates to minimizing the size requirement for protective windows used in light fixture mounted cameras.

BACKGROUND OF THE INVENTION

Cameras are inherently angular measurement devices, so that they create an image of their surroundings by focusing the solid angle of energy falling onto a camera lens onto an imaging sensor. This imaging sensor is generally a continuous two-dimensional matrix of individual sensing photodiodes or other photon to electron conversion devices, also known as picture elements, or "pixels". When an array of pixels is positioned behind a lens, each pixel is effectively illuminated by its incrementally small angular share of the energy being collected and focused by the lens. This incrementally small angular share is also known as the instantaneous field of view (IFOV) of each pixel. In non-distorted camera/lens systems, the IFOV is taken to be equal throughout the system, and conversely, distorted optical systems have a non-uniform IFOV across a sensor area of the imaging sensor. All of the IFOVs taken together constitute a camera's field of view, or FOV. Generally, for modern cameras, the FOV of the camera can have a different value for those pixels in the horizontal and vertical directions, as well as in the diagonal direction. The horizontal FOV is also known as the HFOV, and likewise, the vertical and diagonal FOVs are respectively known as the VFOV and DFOV. Generally, the HFOV is larger than the VFOV, and in all cases, the DFOV is the largest FOV of all within a camera system since it represents the FOV of the diagonal of the normally two-dimensional rectangular imaging sensor. When considering the aperture requirements of a camera system, it is customary to project angular rays from the plane of an entrance pupil of the lens/lens system into the environment. This can be done for each of the HFOV, VFOV and DFOV of the lens, and in doing so, it describes the solid angle subtended by the camera/lens system. This solid angle can be used to further determine what the aperture requirements are, or other optical system elements, as well as to determine what the camera system can actually "see".

When installing camera and sensor systems onto outdoor lighting fixtures, it is advantageous to house these cameras within an external housing in order to reliably and robustly facilitate handling, as well as cosmetic and environmental issues. It is also sometimes desirable to position the cameras of these systems behind a glass transparent window (or the like) for environmental protection as well as for cosmetic reasons. As with all optical systems, alignment of the cameras relative to their surroundings are an important part of their use. This is normally done by utilizing some sort of a simple rotational mechanism which causes the bore sight axis (or central axis) of the camera lens to swivel about some fixed point within this mechanism. This is disadvantageous, however, since doing so will cause the camera lens and its projected FOV to swing through an arc generated by the bore sight axis of the camera lens as it passes through the mechanism pivot point. The larger the rotational requirement for the camera, the longer the arc length that the camera bore sight will trace, and, correspondingly, the larger the aperture of any protective windows in the housing need to be in order to accommodate all rotational aspects of the movement of the camera mechanism and its FOV requirements.

SUMMARY OF THE INVENTION

According to an aspect of the invention, a light fixture is provided, which comprises: a housing comprising a protective window transparent to light and having predefined dimensions; a camera, inside of the housing, configured to provide images of surroundings of the light fixture through the protective window to cover a wide field of view (WFOV) which is substantially larger than a field of view (FOV) of the camera when moving the camera along a predefined trajectory, where at any position of the camera along the predefined trajectory, light rays (e.g. all light rays) received by the camera in the camera FOV are within a substantially same area of the protective window and not shadowed by non-transparent edges of the protective window, where the predefined trajectory is defined by movement in a three-dimensional space of two points, and the camera position is defined by the two points at a given time; and a mechanical module, holding the camera, configured to move the camera along the predefined trajectory. The two points may be arbitrarily chosen on a camera. The light fixture may comprise or provide a minimized window size for camera imaging.

According further to the aspect of the invention, the two points may be located on a central axis of the camera.

According further to the aspect of the invention, the trajectory may be located in a two-dimensional plane (so that the two points are configured to move in the two-dimensional plane), or in the three-dimensional space (so that the two points are configured to move at least in two two-dimensional planes).

Still further according to the aspect of the invention, when the camera moves along the predefined trajectory, a central axis of the camera may swivel around a pivot point or a predefined pivotal area around the pivot point. Further, the pivot point or the predefined pivotal area around the pivot point may be located outside of the housing.

According further to the aspect of the invention, the movement for each of the two points may be a circular, an elliptical path (or the like) at least in one plane.

According still further to the aspect of the invention, the protective window may have a circular, rectangular, polygonal (or similar) shape.

According yet further still to the aspect of the invention, the mechanical module may comprise one mechanism to provide a two-dimensional movement of the camera in one plane. Further, the mechanical module may comprise a further mechanism to provide a further two-dimensional movement of the camera in a further plane, such that both the one and further mechanisms together provide the three-dimensional movement of the camera. Further, the further mechanism of the light fixture may comprise a further four-bar linkage mechanism. Still further, the one mechanism or the further mechanism may comprise a servo or step motor configured to activate the one mechanism. Moreover, the one mechanism can be actuated using some other actuation means such as a lever, or an actuation (threaded) screw. Also the one mechanism can be activated using a linear actuator or a cam (e.g., having an elliptical shape) with a follower.

BRIEF DESCRIPTION OF THE DRAWINGS

These and other features and aspects of the present disclosure will become better understood when the following detailed description is read, with reference to the accompanying drawings, in which like characters represent like parts throughout the drawings, wherein.

DETAILED DESCRIPTION

Figure 1:
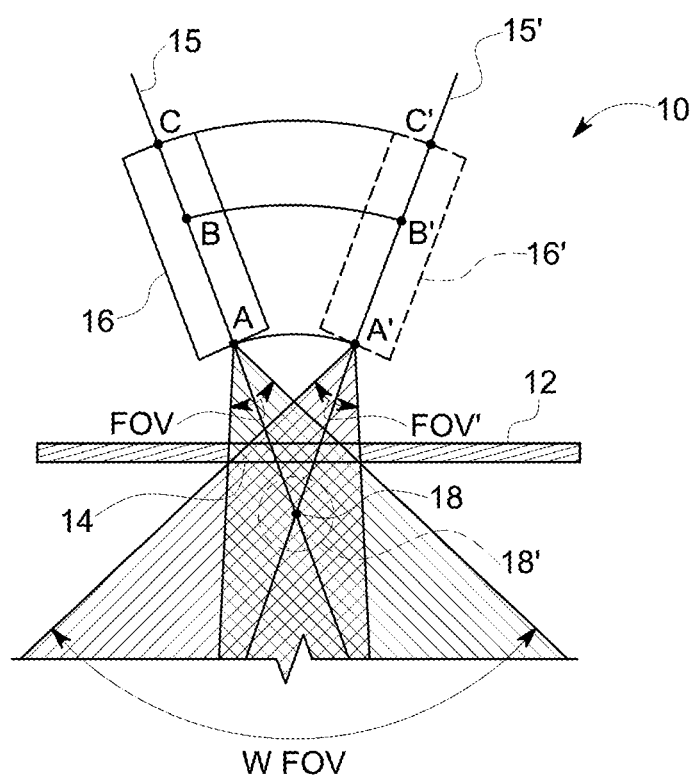
FIG. 1 is a schematic diagram demonstrating a principle of operation for minimizing size requirements for a protective light transparent window, according to an embodiment of the invention.

A light fixture for an imaging camera is presented, where a protective window size requirements for camera imaging in a wide field of view (WFOV) are minimized using directional imaging through the protective window. This can be accomplished by a camera position adjustment according to a predefined algorithm as described herein. This adjustment may be performed using a mechanical motor or manually (using corresponding screws, lever, etc.) to actuate a mechanical mechanism. For example, a four-bar linkage mechanism may be used, which may allow the camera to pivot about a virtual pivot point (or generally, a pivotal area) generated by the intersection of the camera lens bore sight axes (camera lens central axes), e.g., outside of a housing of the light fixture. There may be different mechanism designs that can allow for movement of the camera, such as a sliding member mechanism, or other more complex linkage-type mechanisms. The window may have various shapes such as circular, rectangular, elliptical, quadratic, polygonal and the like.

According to one embodiment of the invention, a light fixture, with a minimized window size for camera imaging, may comprise a housing having a protective window transparent to light and having predefined (minimized) dimensions. Moreover, the light fixture may comprise a camera/lens inside of the housing, and the camera can be configured to provide images of surroundings of the light fixture through the protective window and to cover the wide field of view (WFOV) which is substantially larger than a field of view (FOV) of the camera, when moving the camera along a predefined trajectory, where at any position of the camera along the predefined trajectory, all light rays received by the camera in the camera FOV are within a substantially same area of the protective window and not shadowed by non-transparent edges of the protective window, where the predefined trajectory is defined by a movement in a three-dimensional (3-D) space of at least two points, arbitrarily chosen on a camera, so that the camera position is defined by these two points at any given time. A mechanical module, also located inside of the housing, can hold/host the camera and can be configured to move the camera along the predefined trajectory.

It is noted, that for the purpose of the invention described herein, a predefined trajectory of a camera can be defined by movements (trajectories) in the 3-D space (or in a two-dimensional space, 2-D space) of the two points arbitrarily chosen on the camera, the two points may be located, e.g., on the bore sight axis (the central axis) and/or on the front and the back of the camera. Thus, the position of the camera in 3-D space at any given time can be determined by the two points defining the predefined trajectory at any given time. Also, the system WFOV and the camera FOV can be considered separately for horizontal, vertical or diagonal directions as discussed above in reference to HFOV, VFOV and DFOV.

Thus, according to an embodiment of the invention, when the camera moves along the predefined trajectory, a central axis of the camera can swivel around a (virtual) pivot point or a predefined pivotal area, e.g., around the pivot point, which can be outside of the housing. The movement/trajectory of the camera (i.e., trajectory each of the two arbitrarily chosen two points) can have different patterns/paths such as circular, elliptical or arbitrarily designed for specific applications, provided the condition that, at any position of the camera along the predefined trajectory, all light rays received by the camera in the camera FOV are within a substantially same area of the protective window and not shadowed by non-transparent edges of the protective window.

According to an embodiment described herein, the mechanical module can comprises one mechanism to provide a two-dimensional (2-D) movement of the camera in one plane. Moreover, the mechanical module may comprise a further (second) mechanism to provide a further two-dimensional movement of the camera in a further plane (different from the one plane), such that both the one and further mechanisms together can provide a three-dimensional movement of the camera.

The one mechanism (the same is applicable to the further/second mechanism) can be actuated by a servo motor, step motor, or some other actuation means such as a lever, or an actuation (threaded) screw. Also, the one mechanism can be activated using a linear actuator or a cam (e.g., having an elliptical shape) with a follower.

FIG. 1 is a schematic diagram demonstrating a principle of operation for minimizing size requirements for a protective light transparent window 14 inserted in a housing 12 of a light fixture 10 for an imaging camera/lens 16 (16'), according to an embodiment of the invention. The camera 16 is configured to be moved in a predefined range from a left position (camera 16) defined by any two points of A, B and C on a central axis (or bore sight axis) 15, to a right position (camera 16') defined by any two points of A', B' and C' on a central axis (or bore sight axis) 15'. The trajectory of the camera movement is determined by trajectories of any two of the points A, B and C to the corresponding any two of the points A', B' and C', so that any two of circular curves AA', BB' and CC' define the trajectory in the range of camera movement.

In the left position, the FOV of the camera 16 is such that incoming light rays cover the window 14 without overlapping with non-transparent edges of the housing 12. Similarly, in the right position, the FOV' of the camera 16' is such that incoming light rays also cover the window 14 without overlapping with non-transparent edges of the housing 12. Thus the window 14 can be considered a common aperture. A point 18 is a center of rotation for the circular curves AA', BB' and CC', and can be defined as a virtual pivot point. Moreover, the virtual pivot point 18 can become a pivotal area 18' to allow for tolerances of the design and/or other shapes of the trajectory than circular. It is seen from FIG. 1 that the total (system) field of view, wide field of view, WFOV, which can be covered by the predefined movement camera of the 16 is much larger than the individual FOV of the camera 16.

According to a further embodiment, the one mechanism and/or the further mechanism can comprise a four-bar linkage mechanism. As shown in the following examples, the four-bar linkage mechanism can create a virtual pivot point which is effectively located outside of the mechanism (housing), which, in turn, can allow the solid angle FOV of the camera/lens system to use a much smaller arc than would normally be found in traditional rotating mechanism systems. This allows for much smaller protective windows, due to the fact that all positions of the camera share a common aperture on the protective window as shown in FIG. 1.

The four-bar linkage mechanism can be actuated by a servo motor, step motor, or some other actuation means such as a lever, or an actuation (threaded) screw which can cause rotation of the drive linkage. The drive linkage is likewise normally connected to an intermediate connecting linkage, which can tie the ends of the drive linkage and follower linkage together to form a classic four-bar linkage mechanism. The individual lengths of each linkage in the system may be calculated such that when the camera/lens is moved throughout its movement range, the intersection point of the bore sight axis (central axis) of the lens at each extreme point is outside of the mechanism, thus defining a common aperture on the protective window. The creation of this common aperture will generally allow the forward end of the lens to be positioned close to the protective window and will describe the smallest possible size protective window that can be used in the fixture housing of the camera system.

FIGS. 2-7 demonstrated various illustrations of using four-bar linkage mechanism for implementing embodiment of the invention. It is noted that identical or similar parts/elements are designated using the same reference numbers in different figures.

Figure 2:
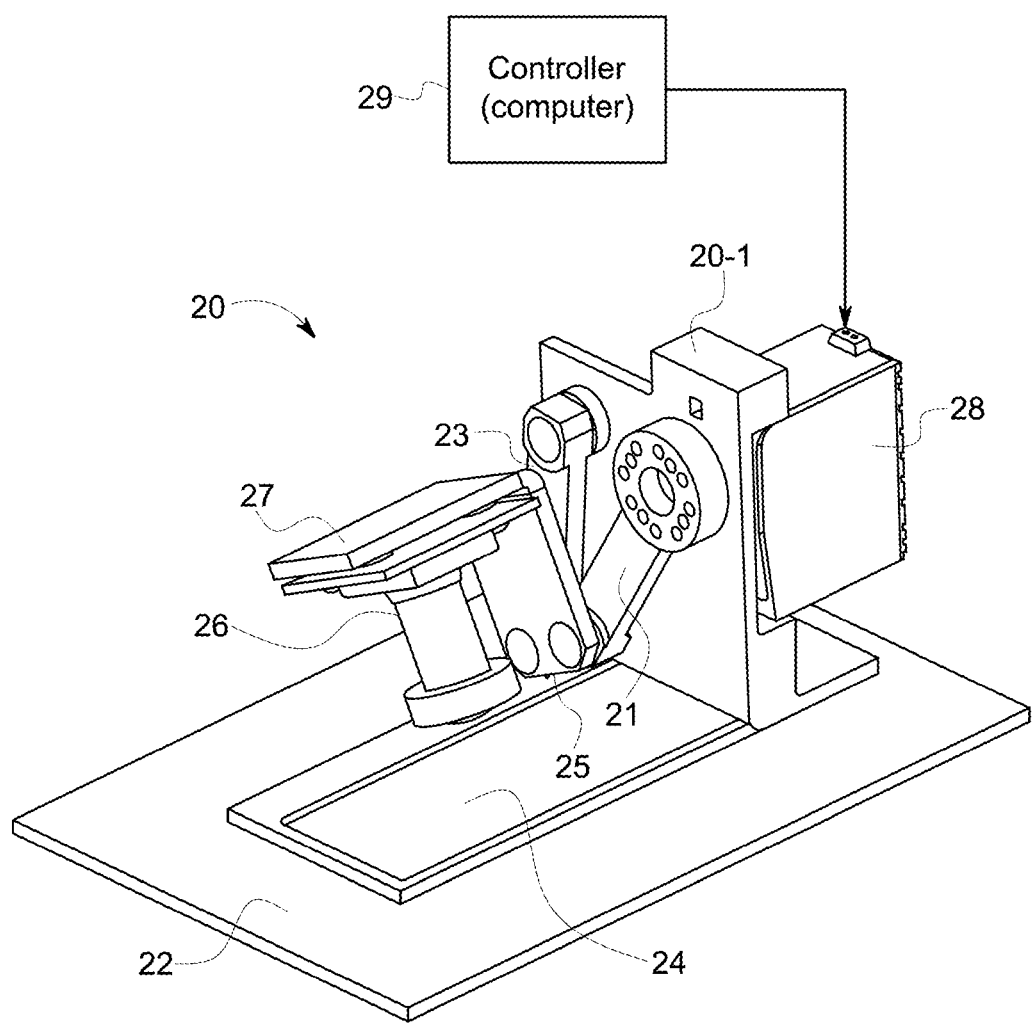
FIG. 2 is a three-dimensional exemplary perspective view of a light fixture using a four-bar linkage mechanism with a servo motor for minimizing a protective window size of a camera, according to an embodiment of the invention.

FIG. 2 is a three-dimensional exemplary perspective view 20 of a light fixture (with a housing only partially shown) for an imaging camera/lens 26 mounted on a camera platform 27 connected to a four-bar linkage mechanism and facing a protective window 24, according to an embodiment of the invention. A servo motor 28 can provide torque on a drive linkage 21 (of the four-bar linkage mechanism) which in turn can create a reaction force in a connecting linkage 25 and a follower linkage 23 which will cause the camera platform 27 (with a mounted camera 26) to move/rotate following a predefined trajectory about a virtual pivot point outside of the housing 22 (not shown in FIG. 2), thus minimizing the aperture requirements (at least for one direction/plane) for the protective window 24 in the housing 22, as described herein. A controller (computer) 29 may provide a command instruction to the servo motor 28 for moving the camera 26 to a desired position.

Figure 3:
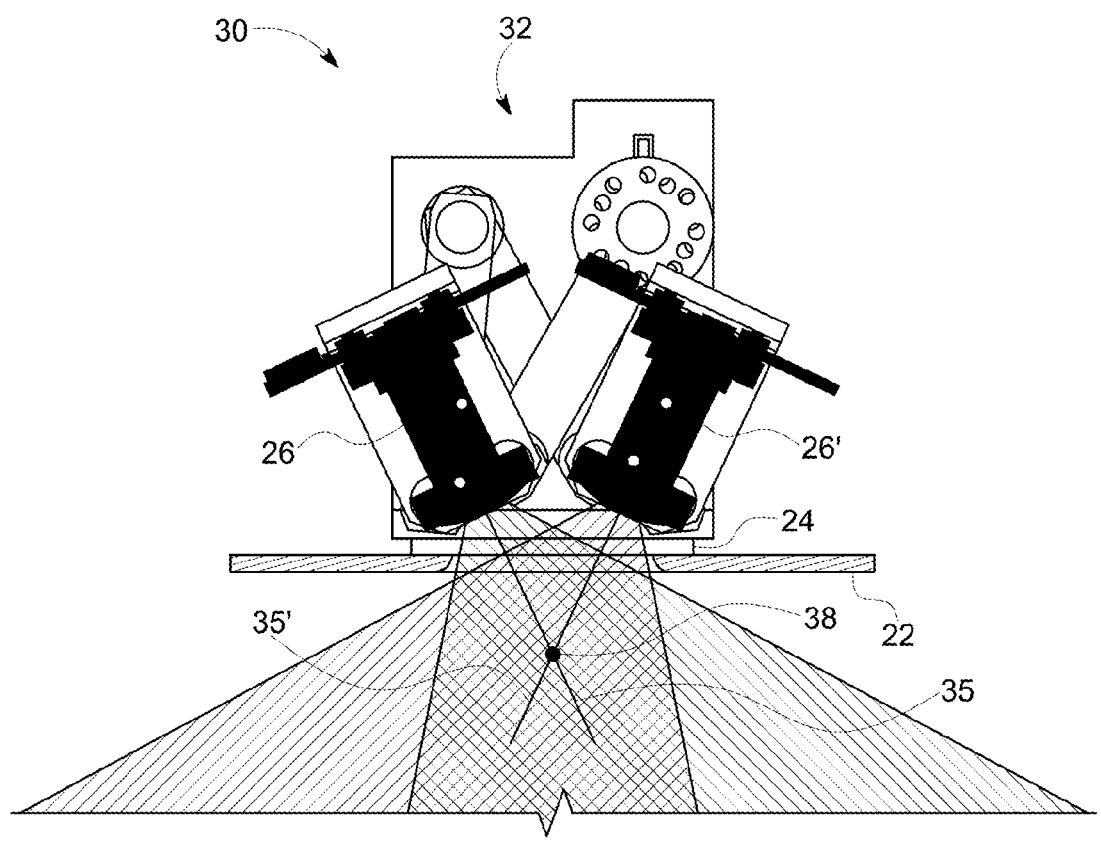
FIG. 3 is an exemplary side view of the light fixture shown in FIG. 2, illustrating predefined range of camera movement for two camera positions, according to an embodiment of the invention.

FIG. 3 is an exemplary side view 30 of the light fixture shown in FIG. 2 with a four-bar linkage mechanism 32, illustrating predefined range of camera movement for two camera positions: a left camera position/camera 26 with a camera/lens central axis 35 and a right camera position/camera 26' with a camera/lens central axis 35'. The axes 35 and 35' intersect at a virtual pivot point 38.

Figure 4A:
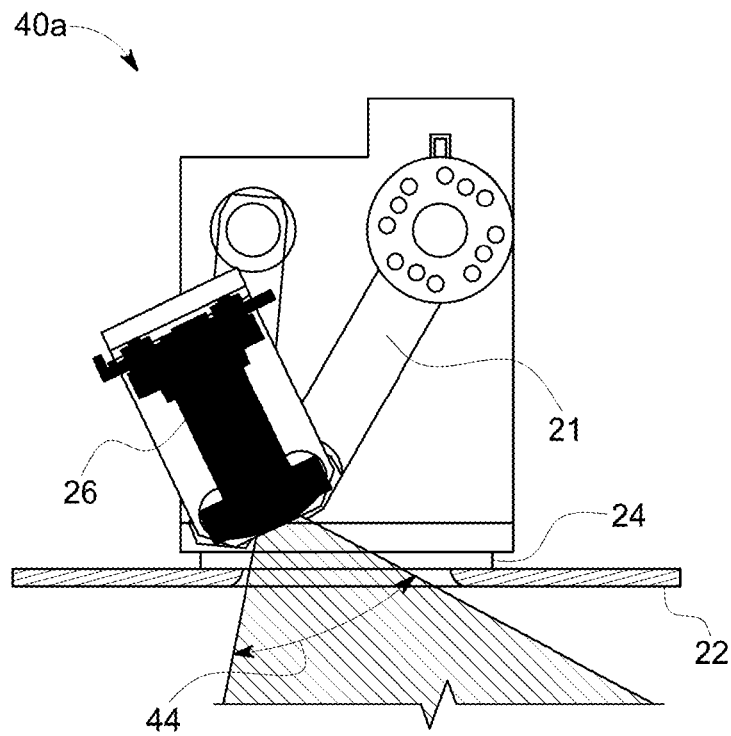
FIGS. 4A-4C are detailed exemplary side views of the light fixture demonstrated in FIG. 4, according to an embodiment of the invention.
Figure 4B:
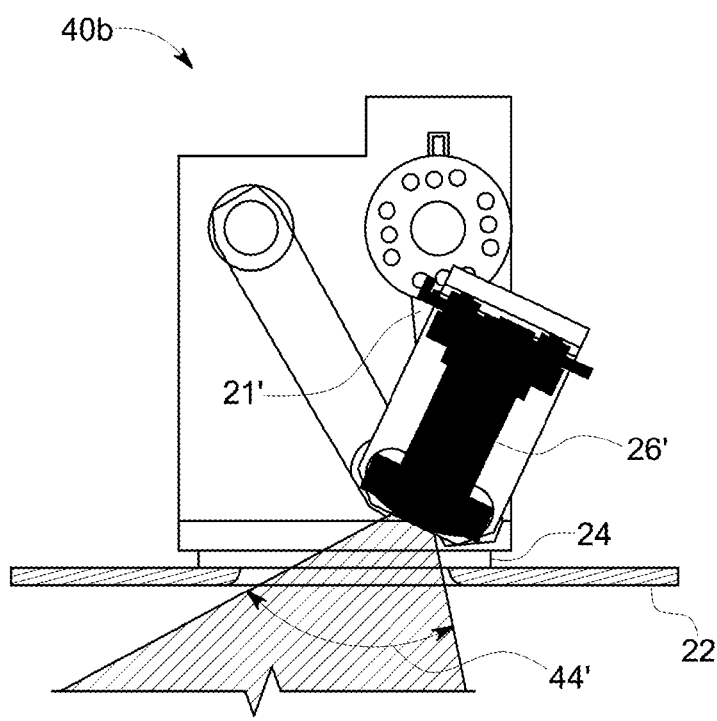
Figure 4C:
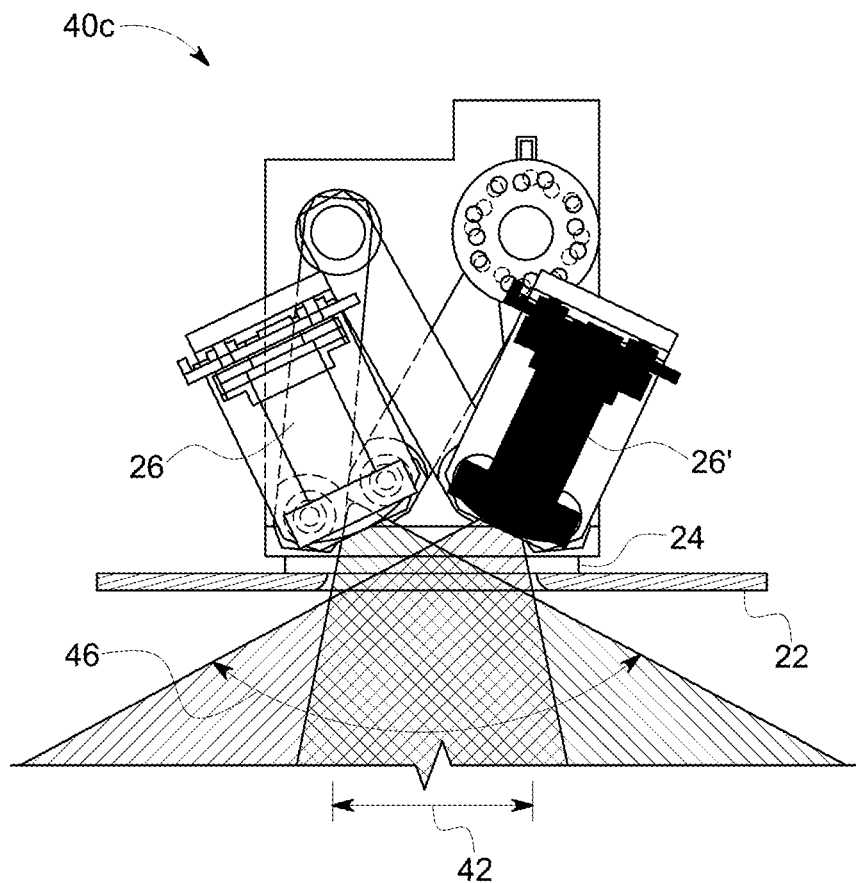

Moreover, FIGS. 4A-4C demonstrate in more detail the exemplary side view 30 of FIG. 4, according to an embodiment of the invention. FIG. 4A shows a left camera position/camera 26 (forward view) with a camera/lens FOV 44. FIG. 4B shows a right camera position/camera 26' (backward view) with a camera/lens FOV 44'. FIG. 4C shows a similar combined forward and backward views as in FIG. 3, but emphasizing a common aperture 42 for both camera positions 26 and 26', as well a wide/combined WFOV 46 which is larger than FOV of the camera 26.

Figure 5:
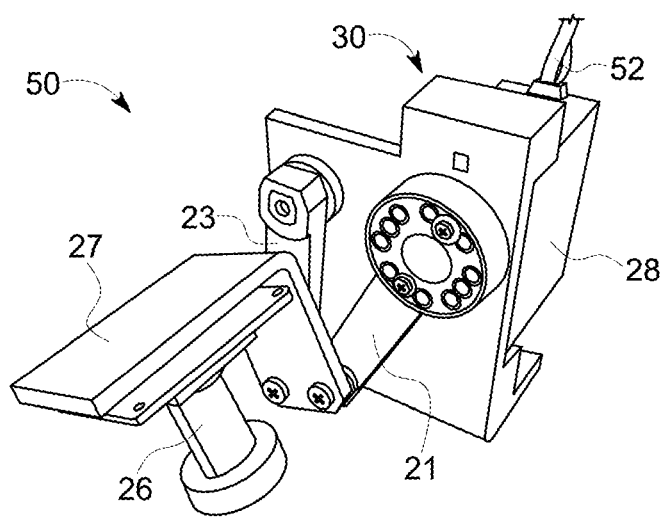
FIG. 5 is a three-dimensional view of an assembly comprising a mechanical module, a camera/lens and a servo motor, according to an embodiment of the invention.

FIG. 5 is a three-dimensional view of an assembly 50 comprising a mechanical module 30, a camera/lens 26 and a servo motor 28, according to an embodiment of the invention. Electrical wires 52 connect the servo motor 28, e.g., to a controller/computer module 29, shown in FIG. 2.

Figure 6:
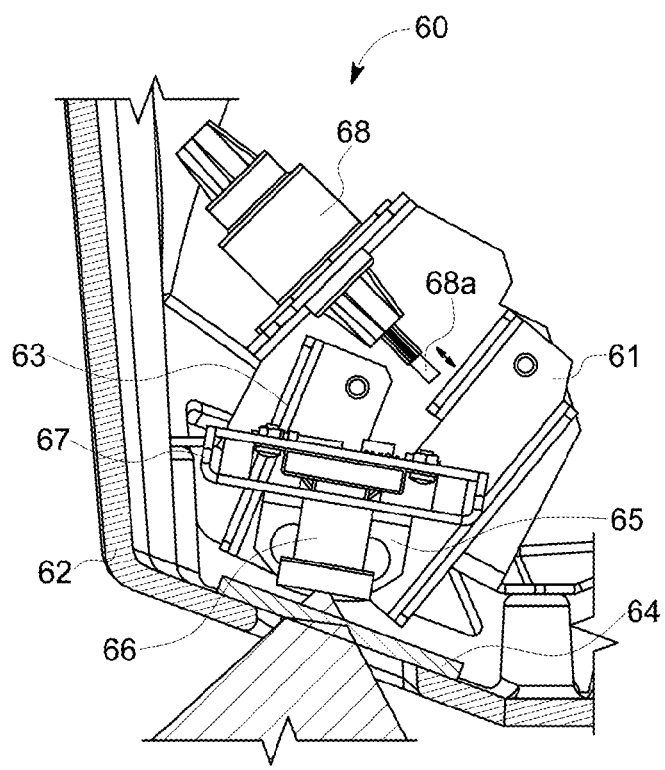
FIG. 6 is another example of a cross-sectional view of a light fixture using a four-bar linkage mechanism driven by a step motor with a linear actuator for minimizing a protective window size of a camera, according to an embodiment of the invention.

FIG. 6 shows another example of a cross-sectional view 60 of a light fixture for an imaging camera/lens 66 mounted on a camera platform 67 connected to a four-bar linkage mechanism and facing a protective light window 64, according to an embodiment of the invention. A step motor 68 with a linear actuator 68a pushes a drive linkage 61 which in turn creates a reaction force in a connecting linkage 65 and a follower linkage 63 which will cause a camera platform 67 (with a camera 66) to move/rotate (following a predefined trajectory) about a virtual pivot point outside of the housing 62 (not shown in FIG. 6), thus minimizing the aperture requirements (at least for one direction/plane) for the protective window 64 in the housing 62, as described herein. It is noted that an extension/torsion spring or other method of providing spring force, such as an elastomeric material (not shown in FIG. 6) will force the drive linkage (with the whole mechanism) to follow the actuator, when the actuator retracts.

Figure 7:
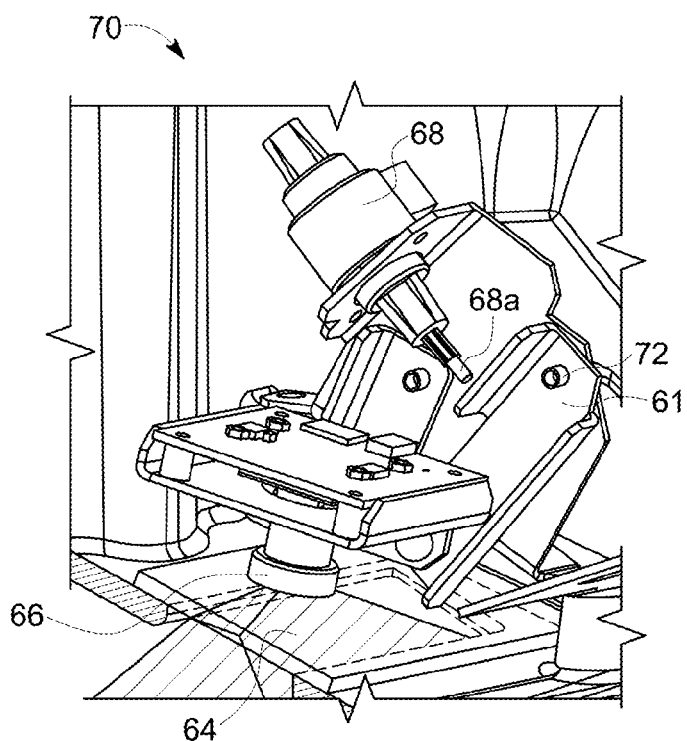
FIG. 7 is a three-dimensional exemplary perspective view of a light fixture utilizing a four-bar linkage mechanism driven by a step motor with a linear actuator for minimizing a protective window size of a camera, according to an embodiment of the invention.
Figure 8:
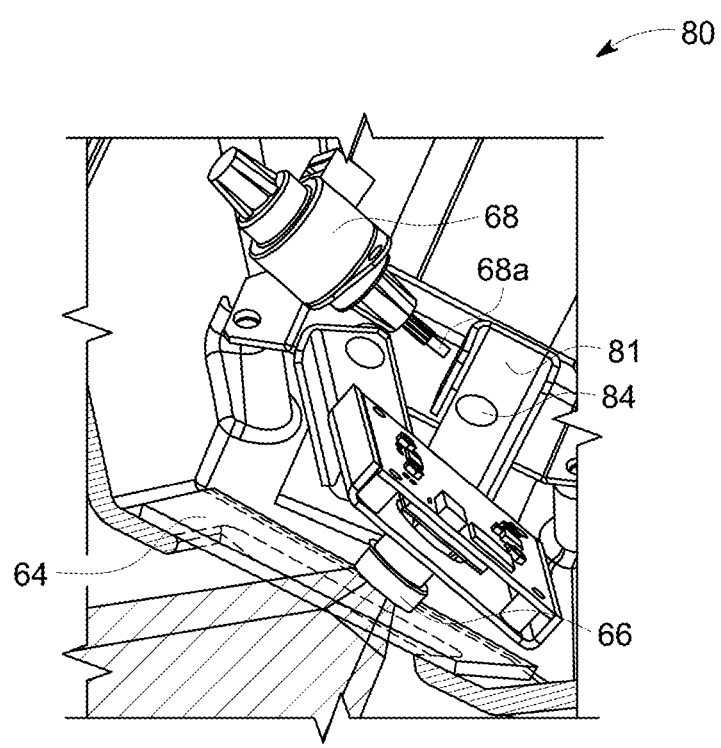
FIG. 8 is a three-dimensional exemplary perspective view of another light fixture utilizing a four-bar linkage mechanism driven by a step motor with a linear actuator for minimizing a protective window size of a camera, according to an embodiment of the invention

FIG. 7 shows a three-dimensional exemplary perspective view 70 of a light fixture (with a housing only partially shown), depicted in FIG. 6, for an imaging camera/lens 66 mounted on a camera platform 67 connected to a four-bar linkage mechanism and facing a protective window 64, according to an embodiment of the invention. A servo motor 68 with the linear actuator 68a pushes a point on a drive linkage 61 which is below a pivot element 72 (as in FIG. 6). FIG. 8 is an alternative implementation of the light fixture shown in FIGS. 6 and 7, where the linear actuator 68a of the step motor 68 pushes a point on a drive linkage 81 which is above a pivot element 82.

It is further noted that minimization of the size of the protective windows in a fixture housing for cameras, as described herein, are important for a number of reasons which include but are not limited to the following:

1. Smaller windows use less material and therefore cost less to manufacture and ship;
2. Smaller windows have shorter edges that need to be sealed to the fixture housing and therefore are more reliable;
3. Smaller windows are less obtrusive to observers on the ground, thereby making the presence of cameras less obvious and more attractive to the users of such systems.

4. Smaller windows are easier and more efficient to keep de-frosted in inclement (rain, snow, frost, freezing) conditions by virtue of the fact that they are less massive and physically smaller which creates a more efficient situation for resistive heaters to keep them warm and above the dew point or freezing point of water; and 5. Smaller windows are easier to design into a fixture housing by virtue of the fact that they are smaller and will therefore interfere less with structural features on the housing.

Unless defined otherwise, technical and scientific terms used herein have the same meaning as is commonly understood by one having ordinary skill in the art to which this disclosure belongs. The terms "first", "second", and the like, as used herein, do not denote any order, quantity, or importance, but rather are employed to distinguish one element from another. Also, the terms "a" and "an" do not denote a limitation of quantity, but rather denote the presence of at least one of the referenced items. The use of "including," "comprising" or "having" and variations thereof herein are meant to encompass the items listed thereafter and equivalents thereof, as well as additional items. The terms "connected" and "coupled" are not restricted to physical or mechanical connections or couplings, and can include electrical and optical connections or couplings, whether direct or indirect.

Furthermore, the skilled artisan will recognize the interchangeability of various features from different embodiments. The various features described, as well as other known equivalents for each feature, can be mixed and matched by one of ordinary skill in this art, to construct additional systems and techniques in accordance with principles of this disclosure.

In describing alternate embodiments of the apparatus claimed, specific terminology is employed for the sake of clarity. The invention, however, is not intended to be limited to the specific terminology so selected. Thus, it is to be understood that each specific element includes all technical equivalents that operate in a similar manner to accomplish similar functions.

It is to be understood that the foregoing description is intended to illustrate and not to limit the scope of the invention, which is defined by the scope of the appended claims. Other embodiments are within the scope of the following claims.

It is noted that various non-limiting embodiments described and claimed herein may be used separately, combined or selectively combined for specific applications.

Further, some of the various features of the above non-limiting embodiments may be used to advantage, without the corresponding use of other described features. The foregoing description should therefore be considered as merely illustrative of the principles, teachings and exemplary embodiments of this invention, and not in limitation thereof.

What is claimed is:

1. A light fixture comprising:
   a housing comprising a protective window transparent to light and having predefined dimensions;
   a camera, inside of the housing, configured to provide images of surroundings of the light fixture through the protective window to cover a wide field of view (WFOV) which is substantially larger than a field of view (FOV) of the camera when moving the camera along a predefined trajectory, where at any position of the camera along the predefined trajectory, light rays received by the camera in the camera FOV are within a substantially same area of the protective window and not shadowed by non-transparent edges of the protective window, where the predefined trajectory is defined by movement in a three-dimensional space of two points, and the camera position is defined by the two points at a given time; and
   a mechanical module, holding the camera, configured to move the camera along the predefined trajectory.

2. The light fixture of claim 1, wherein the two points are located on a central axis of the camera.

3. The light fixture of claim 1, wherein the trajectory is located in a two-dimensional plane, so that the two points are moved in the two-dimensional plane.

4. The light fixture of claim 1, wherein the trajectory is located in the three-dimensional space, so that the two points are configured to move at least in two two-dimensional planes.

5. The light fixture of claim 4, wherein the pivot point or the predefined pivotal area around the pivot point is located outside of the housing.

6. The light fixture of claim 1, wherein, when the camera moves along the predefined trajectory, a central axis of the camera swivels around a pivot point or a predefined pivotal area around the pivot point.

7. The light fixture of claim 1, wherein the movement for each of the two points is a circular path at least in one plane.

8. The light fixture of claim 1, wherein, wherein the movement for each of the two points is an elliptical path at least in one plane.

9. The light fixture of claim 1, wherein the protective window has a circular shape.

10. The light fixture of claim 1, wherein the protective window has a rectangular shape.

11. The light fixture of claim 1, wherein the mechanical module comprises one mechanism to provide a two-dimensional movement of the camera in one plane.

12. The light fixture of claim 11, wherein the mechanical module comprises a further mechanism to provide a further two-dimensional movement of the camera in a further plane, such that both the one and further mechanisms together provide the three-dimensional movement of the camera.

13. The light fixture of claim 12, wherein the further mechanism comprises a further four-bar linkage mechanism.

14. The light fixture of claim 11, further comprising a servo motor configured to activate the one mechanism.

15. The light fixture of claim 11, wherein the one mechanism comprises a four-bar linkage mechanism.

16. The light fixture of claim 11, further comprising a step motor configured to activate the one mechanism.

17. The light fixture of claim 11, wherein the one mechanism is actuated by a linear actuator.

18. The light fixture of claim 11, wherein the one mechanism is actuated by a screw thread.

19. The light fixture of claim 11, wherein the one mechanism is actuated by a mechanical lever.

20. The light fixture of claim 11, wherein the one mechanism is actuated by an elliptical cam and follower.

* * * * *